Figure 1:
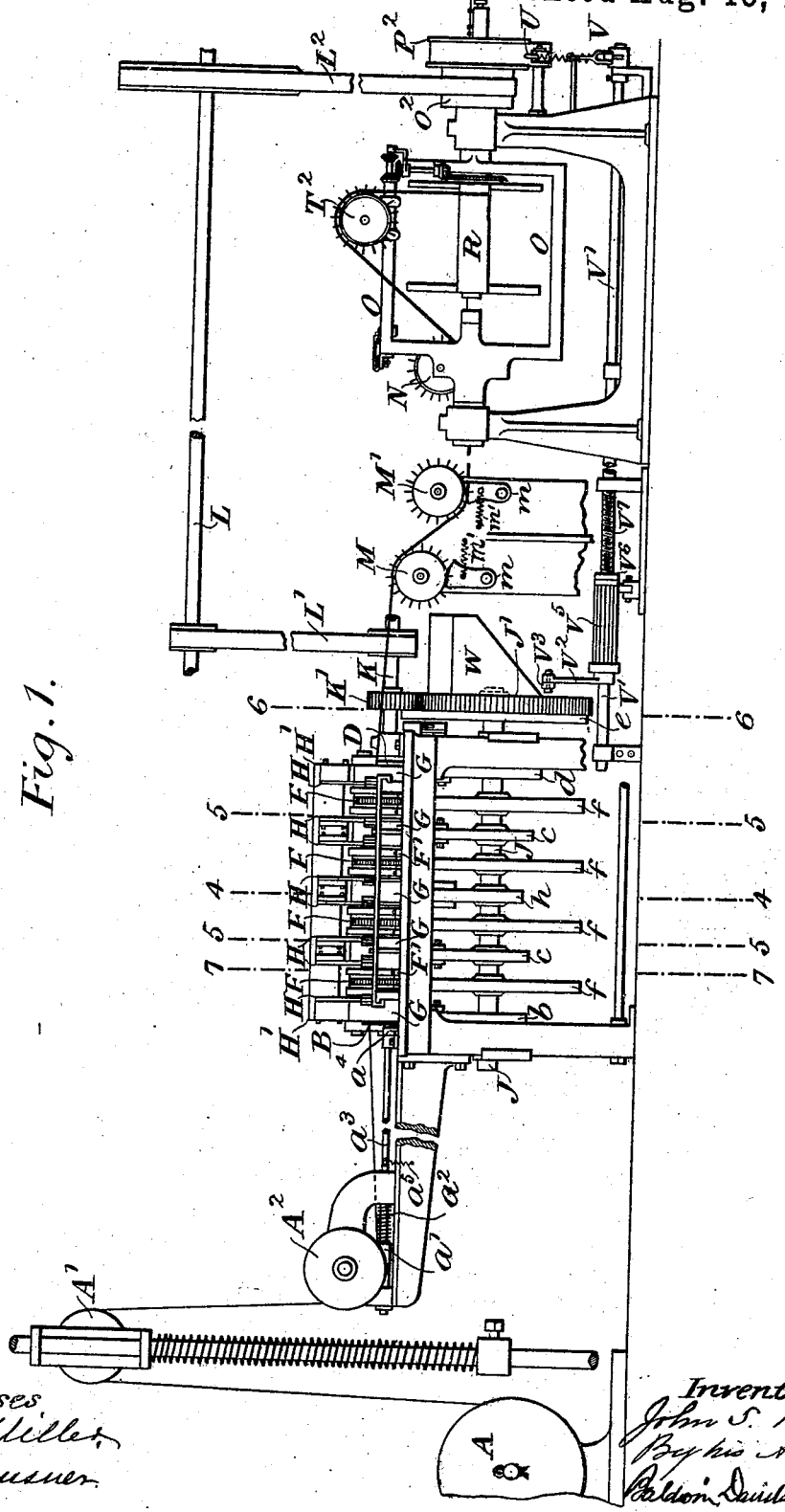

(No Model.) 10 Sheets—Sheet 1.

J. S. REID.
WIRE BARBING MACHINE.

No. 503,162. Patented Aug. 15, 1893.

Witnesses
B. W. Miller
C. F. Sensner

Inventor
John S. Reid
By his Attorneys
Baldwin Davidson & Wight (No Model.) 10 Sheets—Sheet 2.

J. S. REID
WIRE BARBING MACHINE.

No. 503,162. Patented Aug. 15, 1893.

Witnesses
B. W. Miller
C. F. Sensner

Inventor
John S. Reid
By his Attorneys
Baldwin, Davidson & Wight (No Model.)

10 Sheets—Sheet 3.

J. S. REID.
WIRE BARBING MACHINE.

No. 503,162.

Patented Aug. 15, 1893.

Witnesses
B. W. Miller
C. F. Sensner

Inventor
John S. Reid
By his Attorneys
Baldwin, Davidson & Wight (No Model.)

J. S. REID.
WIRE BARBING MACHINE.

No. 503,162.

10 Sheets—Sheet 4.

Patented Aug. 15, 1893.

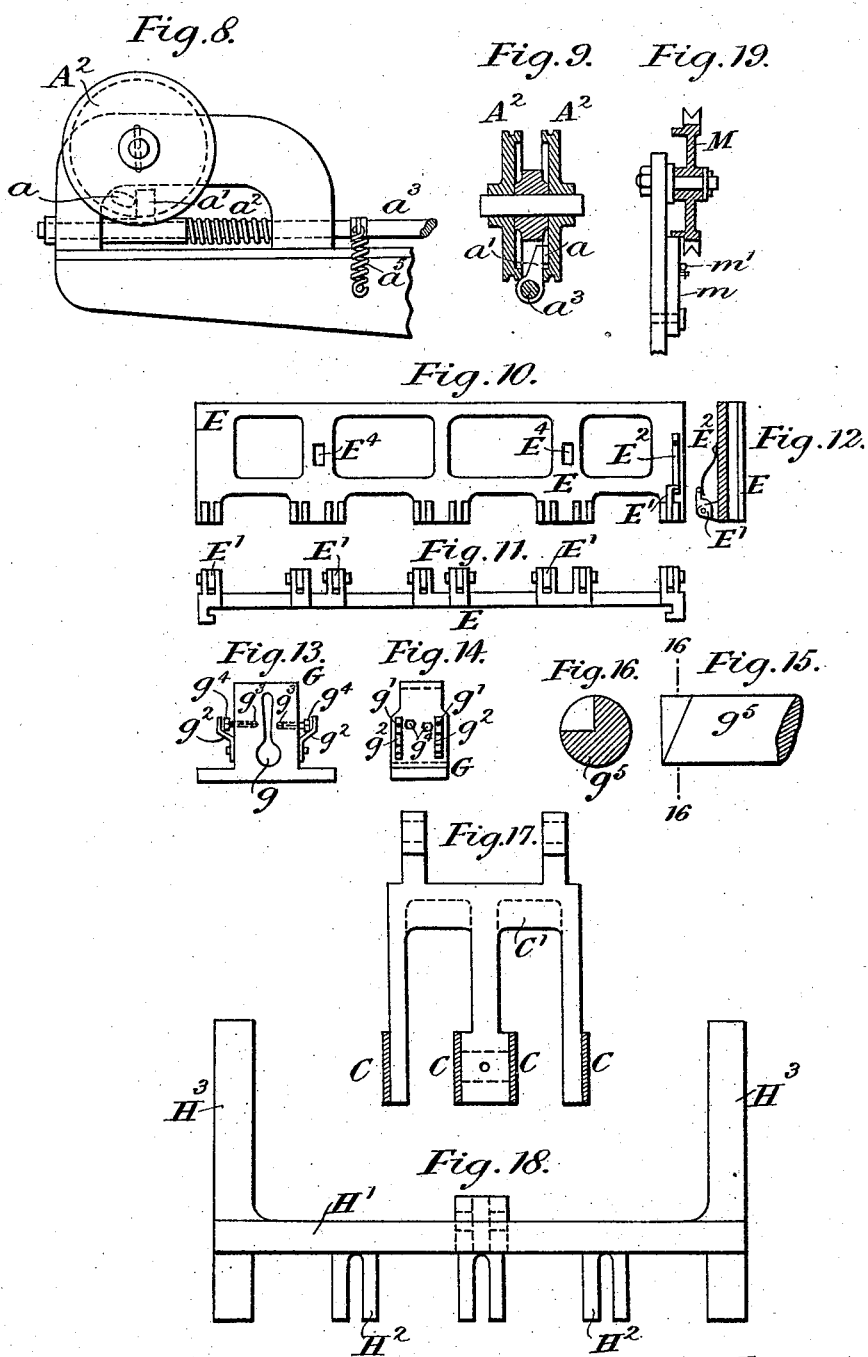

(No Model.) 10 Sheets—Sheet 6.
J. S. REID.
WIRE BARBING MACHINE.

No. 503,162. Patented Aug. 15, 1893.

Witnesses
B. W. Miller
C. F. Sinsner

Inventor
John S. Reid
By his Attorneys
Baldwin, Davidson & Wight (No Model.) 10 Sheets—Sheet 7.
J. S. REID.
WIRE BARBING MACHINE.
No. 503,162. Patented Aug. 15, 1893.
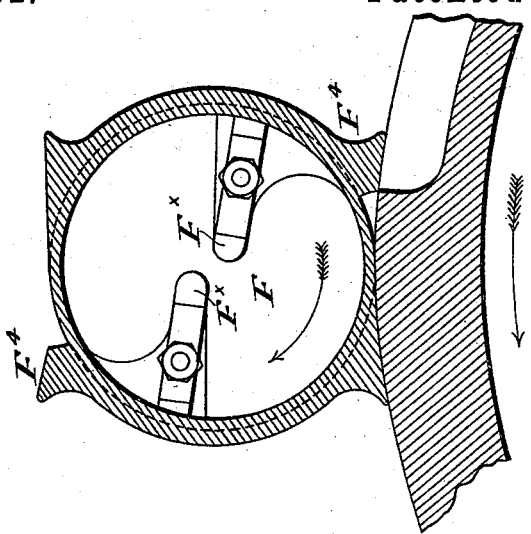
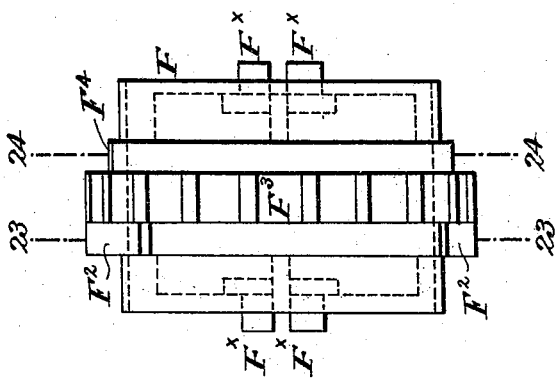
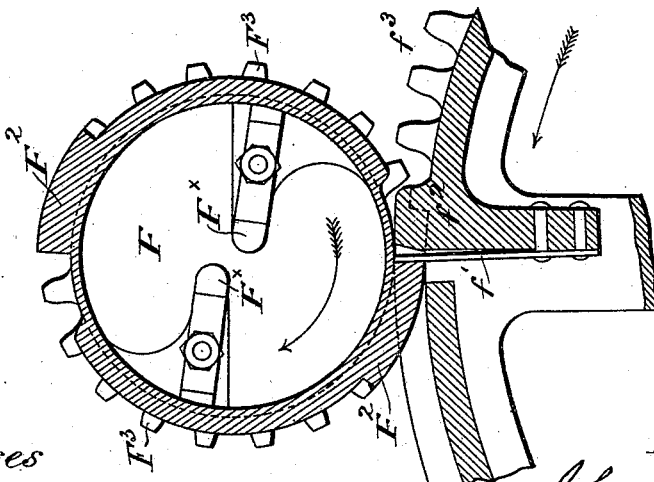
Witnesses
B. W. Miller
C. F. Simms
Inventor
John S. Reid
By his Attorneys
Baldwin, Davidson & Wight (No Model.) 10 Sheets—Sheet 8.
J. S. REID.
WIRE BARBING MACHINE.
No. 503,162. Patented Aug. 15, 1893.
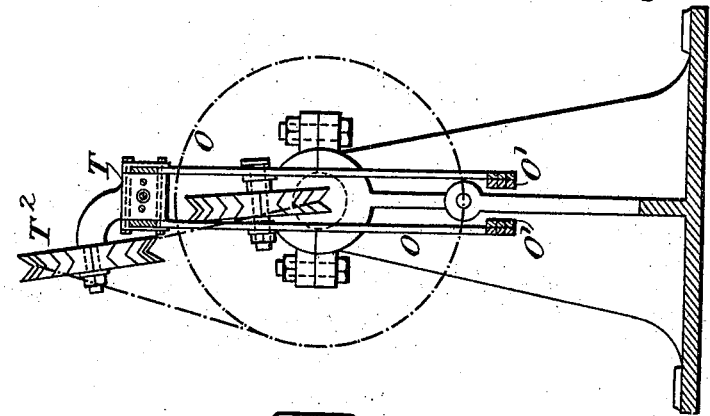
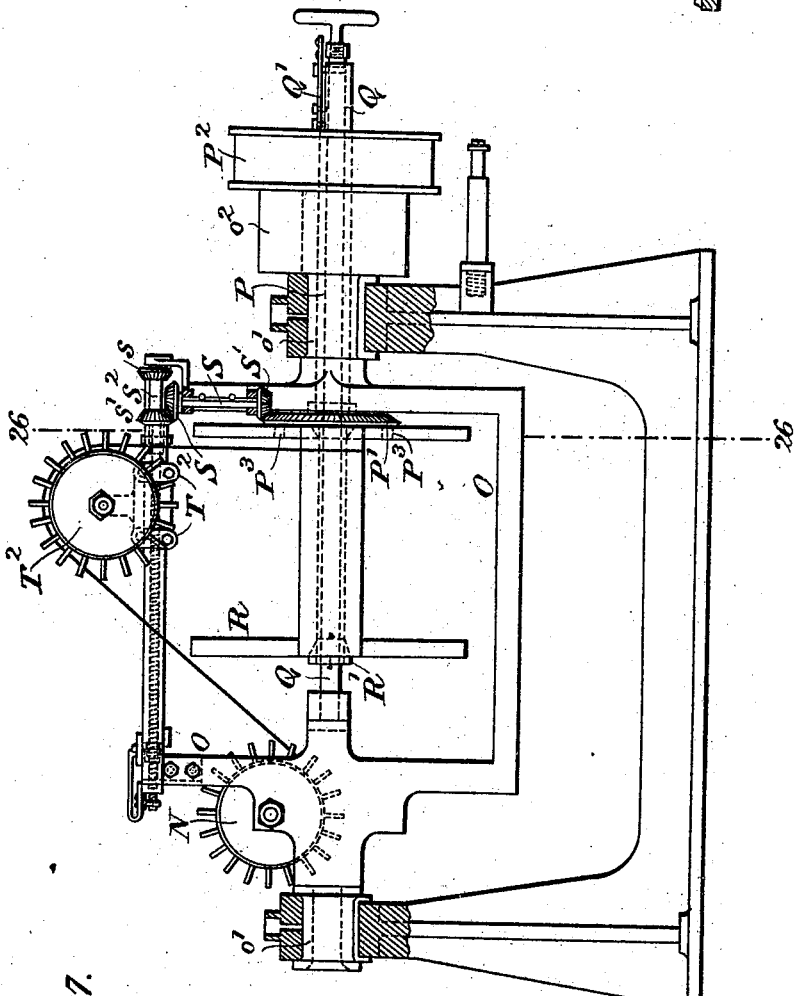
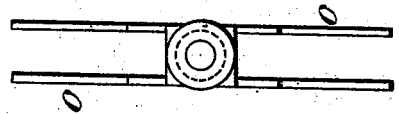
Witnesses
B. W. Miller
C. F. Sumner
Inventor
John S. Reid
By his Attorneys
Baldwin, Davidson & Wight (No Model.)
J. S. REID.
WIRE BARBING MACHINE.
No. 503,162.
Patented Aug. 15, 1893.
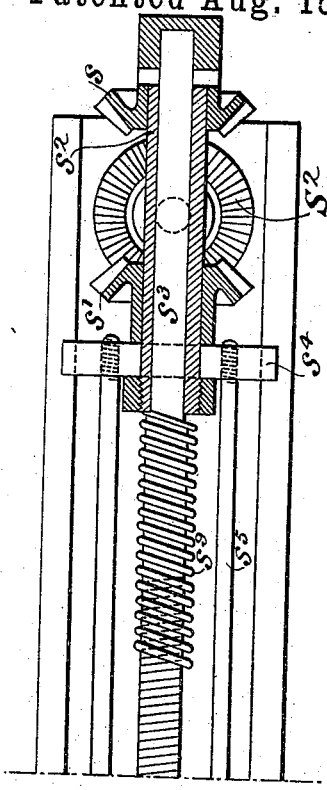
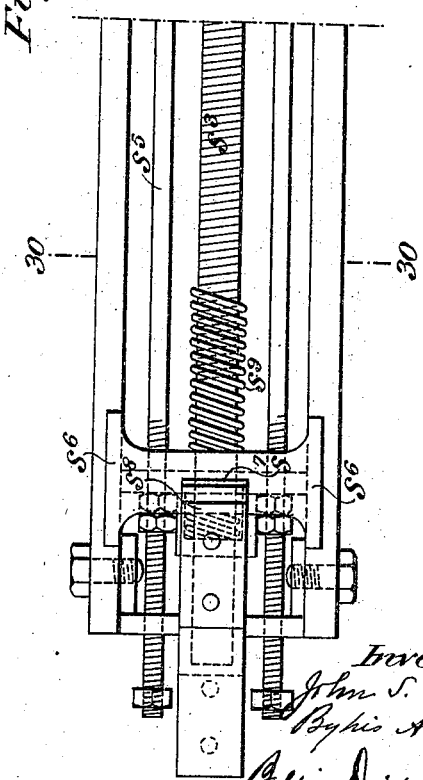
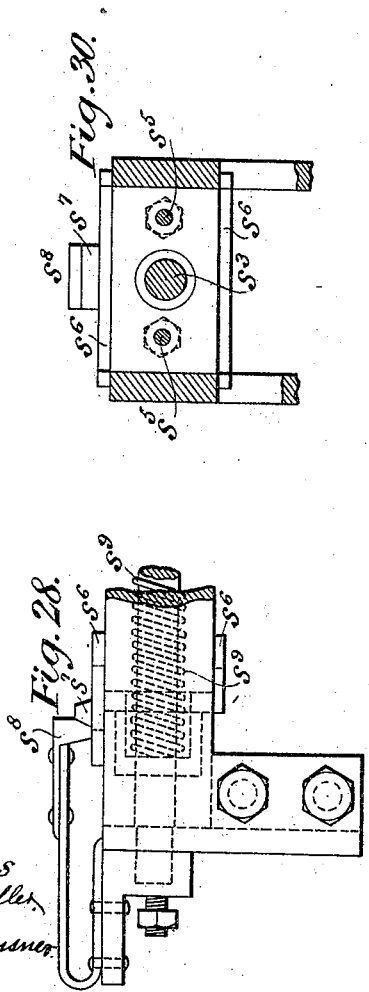
Witnesses
B. W. Miller
C. F. Sensener
Inventor
John S. Reid,
By his Attorneys
Baldwin, Davidson & Wight.

(No Model.) 10 Sheets—Sheet 10.
J. S. REID.
WIRE BARBING MACHINE.
No. 503,162. Patented Aug. 15, 1893.
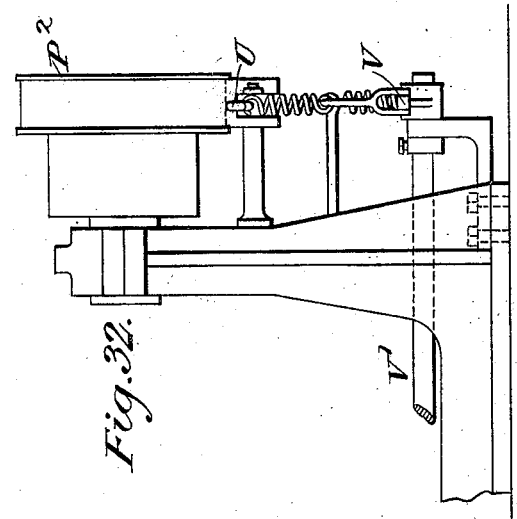
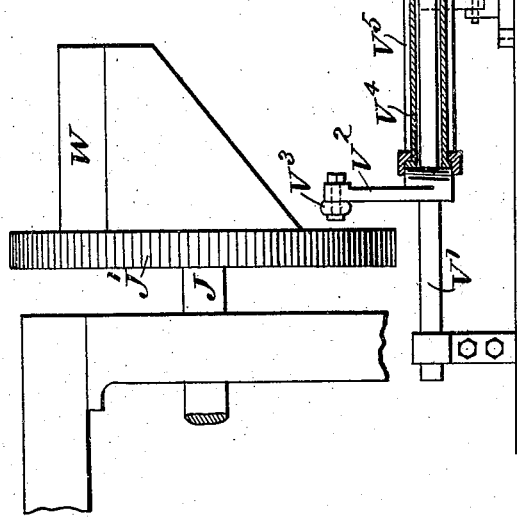
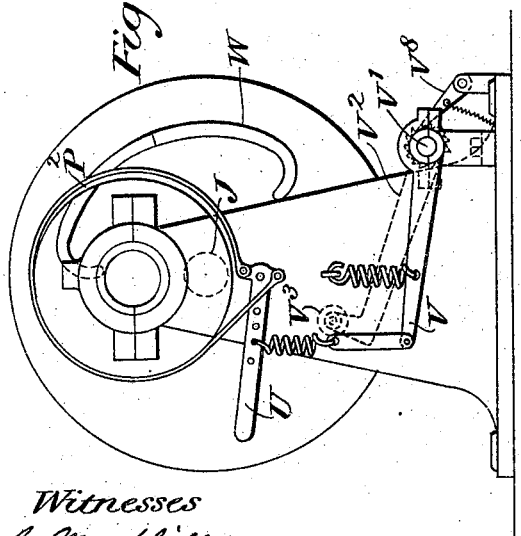
Witnesses
B. W. Miller
C. F. Sensner
Inventor
John S. Reid
By his Attorneys
Baldwin, Davidson & Wight

UNITED STATES PATENT OFFICE.

JOHN STEWART REID, OF LONDON, ENGLAND.

WIRE-BARBING MACHINE.

SPECIFICATION forming part of Letters Patent No. 503,162, dated August 15, 1893.

Application filed March 1, 1893. Serial No. 464,240. (No model.)

*To all whom it may concern:*

Be it known that I, JOHN STEWART REID, mechanician, a subject of the Queen of Great Britain, residing at No. 8 Victoria Street, Westminster, London, England, have invented a certain new and useful Wire-Barbing Machine, of which the following is a specification.

In machines hitherto employed the barbs have been formed one at a time in succession along the main wire or wires as these pass through the machine. According to my invention two or any reasonably greater number of barbs are simultaneously formed on the main wire or wires by one action of the mechanism thereby greatly increasing the rapidity and economy of manufacture. To do this I form the barbs upon the wire when it is at one level and then allow it to assume another level so that the portion that has been barbed can be drawn out through the machine clear of the barbing mechanism.

The following is a description of a machine constructed according to this invention and arranged to form successive groups of eight four-pointed barbs upon two main wires but it will be understood that the machine can readily be adapted to forming groups of other numbers of barbs and that two-pointed barbs or a single main wire may be employed.

Figure 2:
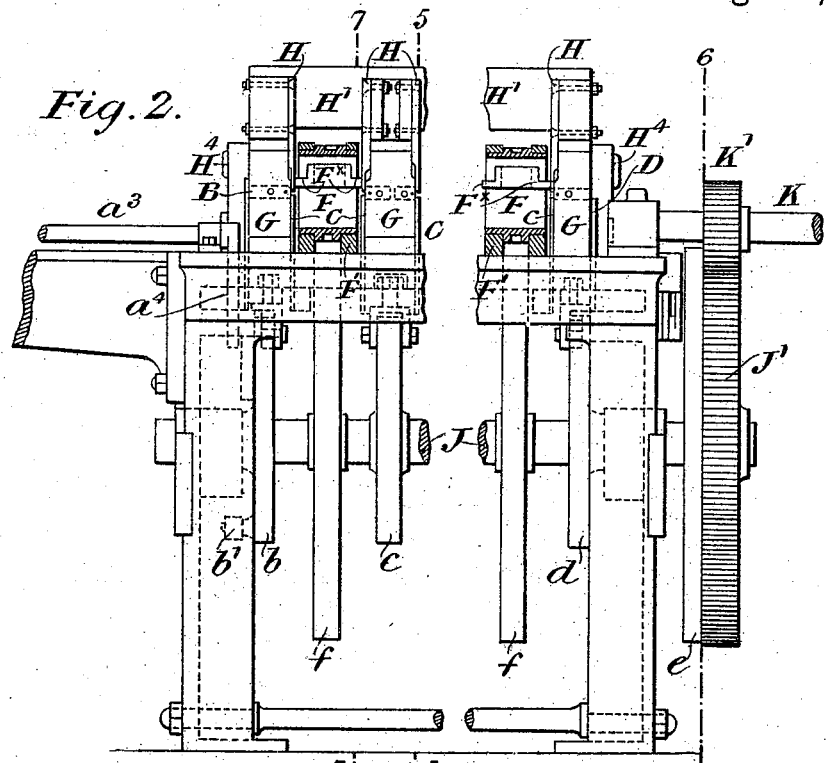
Figure 5:
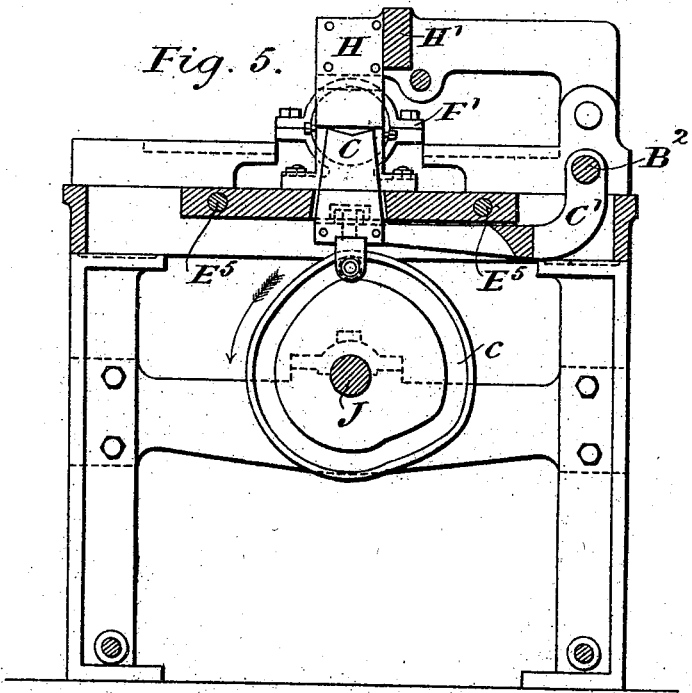
Figure 6:
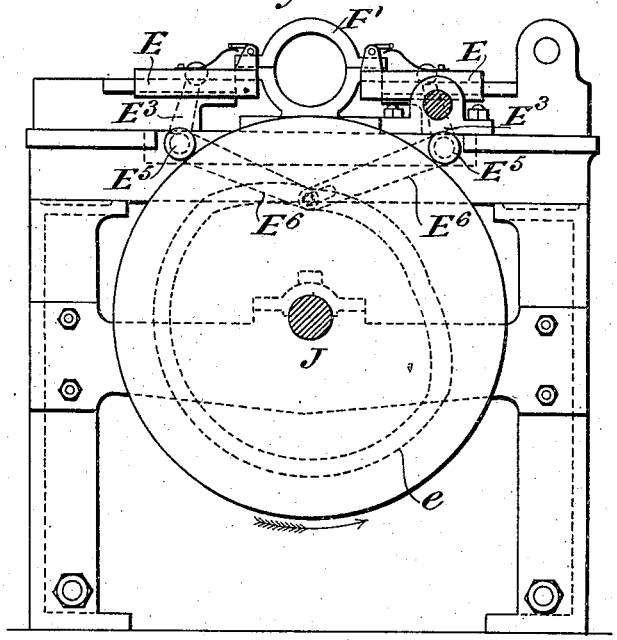
Figure 7:
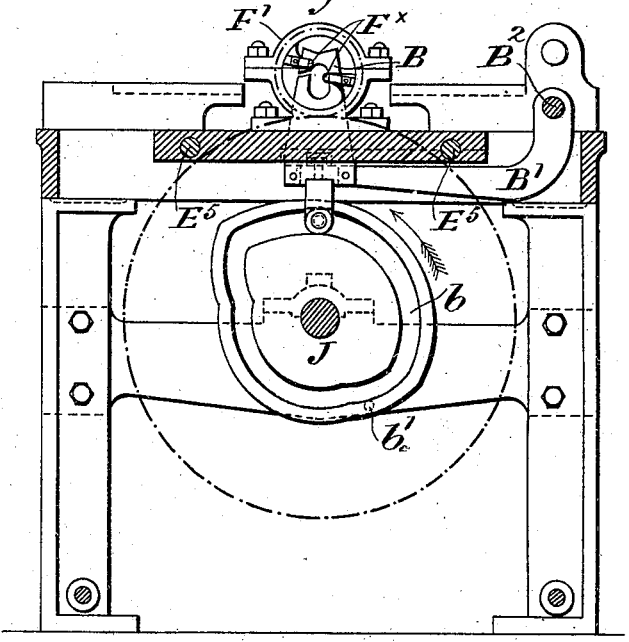
Figure 20:
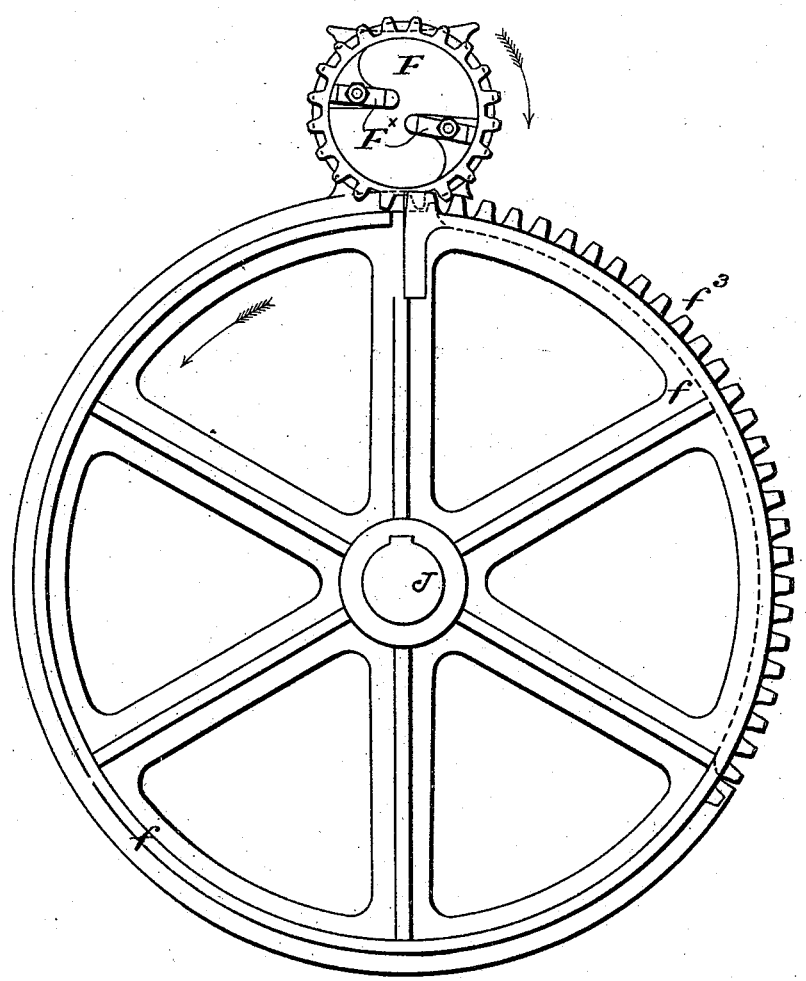
Figure 21:
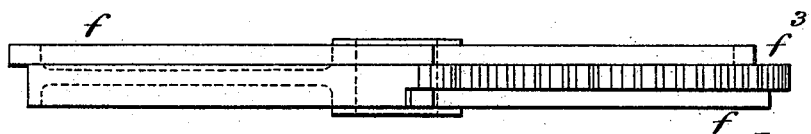

Figure 1 is a front elevation of the complete machine to a smaller scale than any of the other figures. Fig. 2 is a front elevation (partly in section) and Fig. 3 a plan (partly in section) of the two ends of the barbing mechanism. Figs. 4, 5, 6 and 7 are respectively transverse vertical sections on the lines 4—4, 5—5, 6—6, and 7—7, Figs. 1, 2 and 3. In Figs. 5, 6 and 7 the blocks G are omitted and in Figs. 6 and 7 the lifting blades D and C respectively and also the upper shear blades H with their levers are omitted. Figs. 8 and 9 are an elevation and vertical transverse section of the pulley $A^2$. Figs. 10, 11 and 12 are a plan, elevation and transverse section of one of the barb feeding carriages E. Figs. 13 and 14 are side and front elevations of one of the double lower guide and shearing blocks G. Fig. 15 is a plan and Fig. 16 a transverse section (on the line 16—16 of Fig. 15) of one of the cutters $g^5$. Fig. 17 is a plan of one of the main wire elevating levers C' showing the plates C in section. Fig. 18 is a plan of the bar H' with its arms $H^3$ and its projections $H^2$ for carrying the upper shear blades. Fig. 19 is a sectional edge elevation of one of the skeleton guide rolls M or M'. Fig. 20 is an end elevation of one of the barb twisting cylinders F with its wheel $f$, and Fig. 21 is a plan of the latter. Fig. 22 is a back elevation (to a larger scale) of one of the barb twisting cylinders F and Figs. 23 and 24 are sections (on the lines 23—23 and 24—24 of Fig. 22) showing also portions of the wheel $f$. Fig. 25 is a front elevation (partly in section) and Fig. 26 is a transverse vertical section on the line 26—26 (Fig. 25) of the twisting and spooling mechanism. Fig. 27 is an end elevation of the frame O of the flier. Fig. 28 is a part front elevation and Fig. 29 is a plan (both to a larger scale) of the mechanism for traversing the carriage T and roll $T^2$ of the flier, and Fig. 30 is a section on the line 30—30 of Fig. 29. Fig. 31 is an end elevation (with many of the parts omitted.) Fig. 32 is a similar front elevation of the right hand end of the machine showing one end of the mechanism for tightening the brake strap on the pulley $P^2$, and Fig. 33 is a view of the opposite end of this mechanism.

Referring to Fig. 1 the general arrangement of the machine is as follows:—The two main wires are wound on two bobbins A A placed side by side and from there they pass over two pairs of pulleys A' and $A^2$ to the barbing mechanism. After having been barbed but before they are twisted together the two main wires pass to the skeleton rolls M and M' and from there to the skeleton rolls N and $T^2$ and spool R on the flier.

The cycle of the operations is as follows:— First the ends of sixteen cross wires (supplied from spools not shown in the drawings) are passed between the two main wires, are twisted around them and then cut off so forming eight four-pointed barbs. While this is being done the flier O and spool R are revolving together so twisting the portions of the two main wires lying between the skeleton rolls M' and N which have been previously barbed. During these two operations the main wires are stationary in the machine. When the barbing and twisting are complete the spool R commences to revolve relatively to the flier O thus winding up the wire that has been barbed and twisted and drawing a fresh length of the two main wires off the spools A into the machine.

I will now proceed to describe the details of the machine:—In order to absorb the shock which would otherwise be communicated to the feed bobbins A when the main wires are suddenly drawn forward by the winding mechanism at the other end of the machine the pulleys A' are mounted on springs as shown in Fig. 1. The pulleys $A^2$ are mounted on a common axis. Their function is to permit the main wires to be periodically drawn forward the proper distance, that is to say, the length occupied by eight barbs and no farther. For this purpose, as shown in Figs. 8 and 9 one of them is provided with a stud $a$ projecting from its face and coming into contact with an arm $a'$ (abutting against the spring $a^2$) which once in every revolution is caused to come into its path so that the feed drums are stopped while the barb forming mechanism is in action but are released and revolve when the spooling mechanism is started. The arm $a'$ is mounted on the shaft $a^3$ carrying at its right hand end an arm $a^4$ (Fig. 2) which is struck and deflected against the pull of the spring $a^5$ (Fig. 8) by the pin $b'$ on the left hand face of the cam $b$ (Figs. 2 and 7) once in every revolution of the cam shaft J.

The barbing mechanism consists of ten main wire lifting plates B, C, C, C, C, C, C, C, C and D (Figs. 2, 3, 5 and 7); operated respectively by the cams $b$, $c$, $c$ and $d$ (Figs. 1, 2, 5 and 7) on the shaft J, two barb feeding carriages E E (Figs. 3, 6, 10, 11 and 12) operated by the cam $e$ (Figs. 1 and 6) four barb twisting cylinders F, F, F, F, (Figs. 1, 2, 3 and 20 to 24) free to revolve in bearings F' (Figs. 1, 2, 3, 5, 6 and 7) and each having around the outside a ring of teeth gearing with the wheels $f, f, f, f$, on the shaft J, two single and three double fixed lower shear blocks G, G, G, G, G, (Figs. 1, 2, 3, 4, 13 and 14) which have slots that serve as guides for the barbing wires, and eight upper shearing blades H, H, H, H, H, H, H, H, (Figs. 1, 2, 4 and 5) connected by a cross bar H' and operated by the cam $h$ on the shaft J. The latter has fixed to it the wheel J' (Fig. 1) gearing with the pinion K' on the countershaft K driven by a belt L' from the main shaft L.

Figure 3:
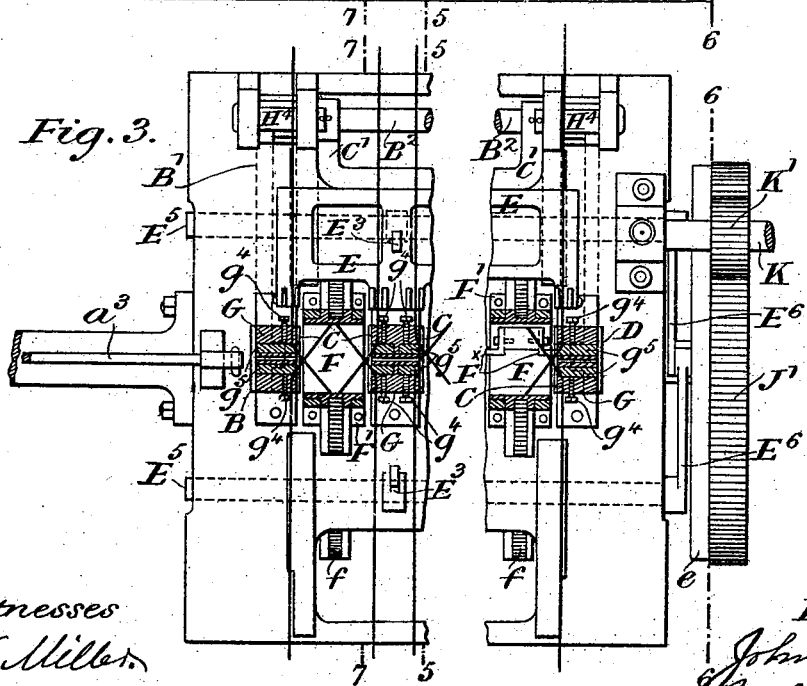
Figure 4:
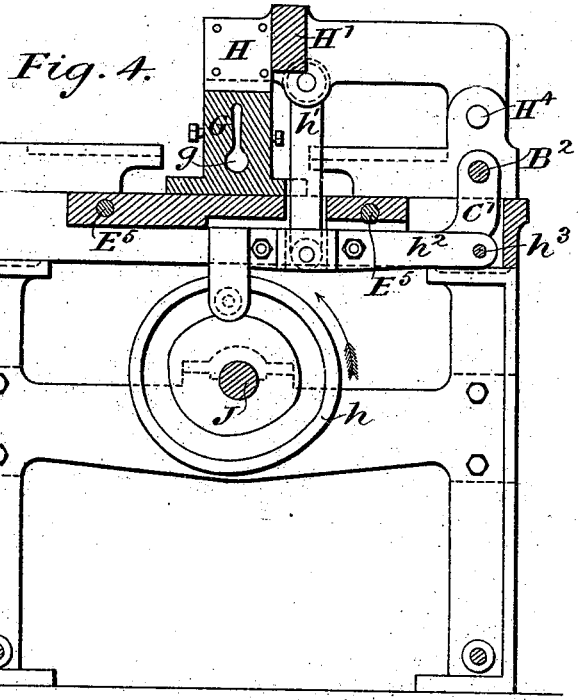

As shown in Fig. 4 the lower shear blocks G have longitudinal guide slots through them terminating at the bottom in circular eyes $g$. When the main wires are undeflected lying in a straight line between the under side of the roll $A^2$ and the upper side of the roll M (Fig. 1) they pass close together through the slotted blocks G at about the middle of these eyes $g$ and it is in this position that they are drawn into the machine to be barbed and are drawn out again after having been barbed, the size of the eyes being sufficient to allow the barbs to pass. After a length of the unbarbed main wires has been drawn into the machine the first thing is to separate them and lift them into the position in which they are barbed, namely into the slots through the blocks G. For this purpose the upper wire is led over the V shaped edge of the plate B (Fig. 7) while the lower wire passes through the hole in the plate B, the latter being fixed to the lever B' pivoted on the rod $B^2$ (Figs. 3, 4, 5 and 7) and raised and lowered by the cam $b$. When the plate B therefore is raised the upper wire is raised more than the lower wire, the two wires being separated by the distance between the bottom of the V and the bottom of the hole. At the other end of the machine the two wires touch each other and lie one above the other on the V shaped edge of the plate D. There is therefore a triangular space between the wires, the base of the triangle being at the plate B and the vertex at the plate D (Figs. 1, 2 and 3). The plate D is not shown to a large scale in the drawings but it is identical in shape to the plates C (Fig. 5) and it is fixed to a lever pivoted to the same rod $B^2$ as the lever C' and the cam $d$ by which it is operated is identical in shape to the cams $c$ but is set slightly in advance of them so that the plate D rises before the plates C. As soon however as the barbing wires have been thrust (as hereinafter described) between the two main wires, the plates C rise and lift the lower wire bringing it parallel to the upper wire and only separated from it by the barbing wires. The eight plates C are fixed in fours to two levers C' (one of which is shown separately at Fig. 17) pivoted on the rod $B^2$ (Figs. 3, 4, 5 and 7). The plates C and D, it will be observed, are reciprocated up and down, or lengthwise, relatively to the slots in the guide blocks G, alternately forcing the main wire or wires along the guides into the position in which they are barbed, and allowing them to escape from the guides after having been barbed.

The sixteen barbing wires are supplied from spools (not shown in the drawings) to the two barb feeding carriages E. E (Fig. 3) one on each side of the main wires. One of these carriages is shown separately in Figs. 10, 11 and 12. It is provided with eight silent pawls E' acted on by springs $E^2$. As the carriages advance toward the main wires these pawls take hold of the barbing wires and thrust a certain length of them forward between the main wires but when the carriages retire the pawls lift so that the wires are not pulled back again. The carriages E E are operated by arms $E^3$ (Fig. 6) whose ends enter slots $E^4$ (Figs. 3 and 10) in them such arms being fixed to two rocking shafts $E^5$ (Figs. 3, 4, 5, 6 and 7) to which are also fixed arms $E^6$ $E^6$ (Figs. 3 and 6) to the end of one of which is fixed a pin passing through a slot in the end of the other and carrying a roller working in the cam groove $e$.

One of the barb twisting cylinders F is shown in side elevation to a larger scale at Fig. 22 and in section on the lines 23—23 and 24—24 (Fig. 22) at Figs. 23 and 24. Each of these is provided on the inside with four projections or fingers $F^\times$ which when the cylinder is rotated come against the four barbing wires and twist them around the two main wires. The cylinders F have an intermittent motion of rotation given to them by the wheels $f$ whose peripheries like those of the cylinder are as shown in Figs. 20 and 21 divided into three rings or sections. The ring in the front of Fig. 20 and at the bottom of Fig. 21 is cylindrical except that, as shown to a larger scale at Fig. 23, it is slotted to receive a spring $f'$ fixed to the front of the tooth $f^2$ projecting from it. Once in every revolution of the wheel $f$ the spring $f'$ comes against one or other of two teeth $F^2$ on the corresponding ring or section of the cylinder F and gradually gives way until it is bent back against the tooth $f^2$. In this manner the cylinder F is put into motion without shock. The middle ring of the wheel $f$ is cylindrical but has teeth $f^3$ projecting from it around one third of its circumference which come into gear with the complete ring of teeth $F^3$ on the middle section of the cylinder F at the moment when the spring $f'$ has been fully compressed. The number of teeth in $f^3$ and $F^3$ is so proportioned that the cylinder F is caused to revolve one and a half times for each revolution of the wheel $f$. The remaining section of the wheel $f$ consists of about two thirds of a cylinder with the remaining third cut away. This forms a locking surface engaging with projections $F^4$ $F^4$ on the remaining section of the cylinder F as shown in Fig. 24. In this figure as in Fig. 23 the cylinder F is just on the point of being unlocked and coming into gear with the wheel $f$.

After the barbs have been twisted onto the main wires they have to be cut off from the barbing wires This is done in the following manner: As shown in Figs. 3, 13 and 14 each of the double fixed lower shear blocks G has four transverse horizontal holes through it each commencing at one or other of four guide eyes $g'$ carried on brackets $g^2$ on the front and back of the block and terminating at $g^3$ on the right and left hand faces. The holes from the front are slightly lower than those from the back or vice versa so that the two sets of barbing wires shall not foul each other. The blocks G also have fixed in them by screws $g^4$ four cutters $g^5$ whose ends lie in the holes $g^3$. These blades consist of steel rods having their ends cut to the forms shown at Figs. 15 and 16. The single blocks G at the two ends of the machine are of similar construction to the double blocks. The sixteen transverse diagonal holes in the blocks G form guides for the sixteen barbing wires and when the latter are thrust forward by the carriages E E cause their ends to advance diagonally as shown in Fig. 3 into the interior of the cylinder F and across the paths of the fingers $F^\times$ fixed therein. The upper shear blades H are fixed to projections $H^2$ on the cross bar $H'$ (Fig. 18) the latter having fixed to it two arms $H^3$ pivoted on axes $H^4$ $H^4$ (Figs. 3 to 5). An up and down motion is given to the blades H by the cam $h$ (Figs. 1 and 4) by means of the connecting rod $h'$ (Fig. 4) and the lever $h^2$ pivoted at $h^3$. These blades not only serve as cutters to sever the barbing wires diagonally as they rest upon the cutters $g^5$ so as to form points but their continued downward motion forces the two main wires out of the slots in the blocks G into the eyes $g$ the plates B, C and D descending at this moment to allow this to be done. The barbing has now been completed and the untwisted main wires with the barbs upon them are in position to be drawn out of the barbing machine to be twisted and spooled. From the barbing machine the barbed but untwisted main wires pass over the skeleton guide roll M (Fig. 1) and under the skeleton guide roll M'. A sectional edge elevation of one of these rolls is shown at Fig. 19. Each of them is provided with a silent pawl $m$ operated by a spring $m'$ which allows them to turn freely when the main wires are being drawn through the machine but prevents them from turning in the opposite direction. From the roll M' the wires pass along the axial line of the flier to the skeleton guide roll N upon it. The distance between the rolls M' and N is equal to that occupied by eight barbs. When the flier revolves the two main wires are twisted together and the manufacture of the barbed wire is complete, the remaining operation being merely to wind it upon the spool R.

The flier is shown in sectional side elevation and end elevation to a larger scale at Figs. 25 and 26. O is a frame (shown separately in end elevation at Fig. 27) carrying the various parts which are balanced by longitudinal bars O' bolted to it. The frame O of the flier is mounted on hollow trunnions $o$ $o'$ the latter having fixed to it the belt pulley $o^2$ which is continuously driven by the belt $L^2$ from the main shaft L (Fig. 1). Within the hollow trunnion $o'$ is a sleeve P carrying at one end the bevel wheel P' and at the other end the brake pulley $P^2$. Within the sleeve P is an axial rod Q, provided with a catch Q' so that it can be withdrawn for the removal of the spool R mounted upon it. The spool is caused to revolve with the wheel P' by pins $P^3$ projecting from the face of the latter and is kept in place by the sliding nut R' secured on the rod Q by a pin. The bevel wheel P' gears with a bevel pinion S' upon a radial axis S whose other end carries a bevel pinion $S^2$ gearing with one or other of two bevel pinions $s$ $s'$ fixed to the sleeve $s^2$. These parts are shown to a larger scale at Fig. 29. Inside the sleeve $s^2$ is a rod $s^3$ working in bearings $s^4$ $s^4$ fixed in the flier frame. The sleeve $s^2$ is free to move longitudinally on the rod $s^3$ but the two rotate together being connected by a groove and feather. The portion of the rod $s^3$ which is not in the sleeve has upon it a screw thread gearing with a nut upon a carriage T free to move between the bars forming the frame O of the flier. The carriage T has upon it a skeleton guide roll $T^2$ over which the wire is led from the roll N to the spool R.

The action of the apparatus is as follows:— When the brake pulley $P^2$ is not retarded by the brake strap the flier and the spool R rotate together the only result being to twist together the portion of the two main wires which lies between the rolls $M'$ and N. When however the brake strap is tightened the spool is retarded and the barbed wire is wound up upon it. Another result is that the pinion $S'$ is driven by the wheel $P'$ thereby rotating the pinion $s'$ and screw rod $s^3$ causing the carriage T to move along the flier and lay the barbed wire evenly on the spool R. In order to reverse the motion of the carriage when the winding of one layer of wire on the spool has been completed and another is to be commenced the arrangement shown in Figs. 28, 29 and 30 is adopted. The sleeve $s^2$ rotates in the plate $s^4$ which is free to slide between the bars O and is connected by the rods $s^5$ to the similar plate $s^6$ which has projecting from its top the double incline $s^7$ which abuts against the spring catch $s^8$. When the carriage approaches the ends of its course it comes against and compresses one or other of the helical springs $s^9$ upon the screw rod $s^3$ gradually compressing it. Ultimately the pressure becomes sufficient to lift the spring catch $s^8$ and then the spring $s^9$ moves the plates $s^4$ and $s^6$ with the sleeve $s^2$ to one side throwing the pinion $s'$ out of gear with the pinion $S^2$ and the pinion $s$ into gear with it thereby causing the carriage to move back again. The brake strap upon the pulley $P^2$ is tightened at the proper moment by the lever U (Figs. 31 and 32) connected by a spring to an arm V on one end of the rocking shaft $V'$ to whose other end is fixed the arm $V^2$ carrying the roller $V^3$ bearing on the cam W on the shaft J of the barbing mechanism.

In the operation of the machine it is necessary that the duration of the action of the cam upon the spool-brake-wheel shall gradually diminish in the same proportion as the diameter of the barbed wire rolled on the spool gradually increases. To effect this I make the cam of considerable width across its face, (which is made of the exact form and length necessary to give the desired degree of diminishing action) and I cause a lever to move progressively along the face of the cam under the action of the following mechanism: The cam lever $V^2$ is furnished with a key or feather inside its socket fitting into a long groove cut in the rocking shaft $V'$ so as to be simultaneously capable of moving along the shaft and of oscillating the same. The cam lever $V^2$ is firmly secured to a sleeve piece $V^4$ provided with a suitable number of ratchet teeth $V^5$ around its periphery for its full length and terminates in a screw nut $V^6$ fitting on a screw $V^7$ cut on the above mentioned rocking shaft $V'$. A pawl $V^8$ is kept normally engaged with the ratchet teeth under the pulling action of a suitable spring. It will be seen that when shaft $V'$ is oscillated forward by the cam W its movement is not shared in by sleeve piece which is held by its ratchet teeth $V^5$ engaging with the pawl $V^8$ but that its backward oscillation under the contraction of the spring is freely permitted. Such progressive action results in the nut $V^6$ advancing gradually along its central screw $V^7$ and thus moving the lever $V^2$ along the shaft $V'$ and the roller $V^3$ therefore on it acts successively on different portions of the cam W.

In order that the combined lever $V^2$ and sleeve piece $V^4$ may be returned along the shaft $V'$ to its starting point when an empty spool has replaced a full one, the nut $V^6$ is made in two halves, hinged on a stud projecting suitably from the sleeve piece and is provided with a suitable catch which enables said hinged halves to be thrown apart clear of the central screw (thus permitting the return of the sleeve-piece) while enabling the said halves to be again secured together at pleasure.

What I claim is—

1. In a wire barbing machine, the combination of mechanism for intermittently drawing lengths of an unbarbed main wire or wires into the machine, mechanism for simultaneously forming two or more barbs upon such main wire or wires, and mechanism for alternately moving such main wire or wires laterally relatively to the barbing mechanism to bring the wire or wires into and out of the range of operation of the barbing mechanism.

2. In a wire barbing machine, the combination of mechanism for intermittently drawing lengths of unbarbed main wires into the machine, mechanism for twisting together such main wires after they have been barbed, mechanism for simultaneously forming two or more barbs upon such main wires, and mechanism for alternately moving such main wire or wires laterally relatively to the barbing mechanism to bring the wire or wires into and out of the range of operation of the barbing mechanism.

3. In a wire barbing machine, the combination of a spool or spools on which an unbarbed main wire or wires are wound, mechanism for intermittently drawing lengths of such main wire or wires into the machine, mechanism for simultaneously forming two or more barbs upon such main wire or wires, a pulley or pulleys round which such main wire or wires pass situated between the said spool or spools and the barbing mechanism, and mechanism for alternately holding and releasing such pulley or pulleys.

4. In a wire barbing machine, the combination of a spool or spools on which the unbarbed main wire or wires are wound, mechanism for intermittently drawing lengths of such main wire or wires into the machine, mechanism for simultaneously forming two or more barbs upon such main wire or wires, a pulley or pulleys round which such main wire or wires pass situated between the said spool or spools and the barbing mechanism, mechanism for alternately holding and releasing such pulley or pulleys, and a pulley or pulleys over which such main wire or wires pass mounted on springs and situated between the first mentioned pulley or pulleys and the said spool or spools.

5. In a wire barbing machine, the combination of mechanism for intermittently drawing lengths of an unbarbed main wire or wires into the machine, mechanism for simultaneously forming two or more barbs upon such main wire or wires, guides between which such main wire or wires lie while being barbed, and two plates one at each end of the barbing mechanism which reciprocate lengthwise of the guides alternately forcing such main wire or wires along the guides into the position in which they are barbed and allowing them to escape from the guides after having been barbed.

6. In a wire barbing machine, the combination of mechanism for intermittently drawing lengths of an unbarbed main wire or wires into the machine, mechanism for simultaneously forming two or more barbs upon such main wire or wires, guides between which such main wire or wires lie while being barbed, and plates at the two ends of the machine and between each set of barbing mechanism reciprocating lengthwise of the guides alternately forcing such main wire or wires into the position in which they are barbed and allowing them to escape from the guides after having been barbed.

7. In a wire barbing machine, the combination of mechanism for intermittently drawing lengths of unbarbed main wires into the machine, guides between which such main wires lie while being barbed, two plates one at each end of the barbing mechanism which reciprocate lengthwise of the guides, two edges upon one of the plates and one edge upon the other plate each edge abutting against one or more of the main wires separating them and alternately forcing them along the guides and allowing them to escape from the guides, mechanism for inserting barbing wires between the main wires, mechanism for twisting the barbing wires around the main wires, and mechanism for cutting off the barbing wires.

8. In a wire barbing machine, the combination of mechanism for intermittently drawing lengths of unbarbed main wires into the machine, the main wire lifting plates B, C and D, mechanism for raising the end plates B and D in advance of the plates C, the barb feeding carriages E, the intermittently rotating barb twisting cylinders F, the fingers $F^x$ within the cylinders, the fixed lower shear blocks G with the longitudinal slots, eyes $g$ and transverse holes through them, and the reciprocating upper shear blades H.

9. In a wire barbing machine, the combination of mechanism for simultaneously forming two or more barbs upon the main wires, a rotating flier for twisting together the main wires after they have been barbed, a spool upon the flier normally rotating with it, and an intermittently operated brake acting on the spool causing it to revolve relatively to the flier and wind up the wire which has been barbed and draw the unbarbed main wires into the machine.

10. In a wire barbing machine, the combination of mechanism for simultaneously forming two or more barbs upon the main wires, a rotating flier for twisting together the main wires after they have been barbed, a spool upon the flier, a brake strap acting on the spool, the lever U fixed to the strap, the arm V, fixed to the rocking shaft V' and operating the lever U through a spring, the arm $V^2$ also fixed to the shaft V', and the cam W operating the arm $V^2$.

11. In a wire barbing machine, the combination of mechanism for simultaneously forming two or more barbs upon the main wires, a rotating flier for twisting together the main wires after they have been barbed, a spool upon the flier, the wheel P' fixed to the spool, the pinion S' gearing with the wheel P', the pinion $S^2$ upon the same shaft as the pinion S' and gearing alternately with the pinions $s$ and $s'$ fixed to the sleeve $s^2$, the screw rod $s^3$ within the sleeve and connected to it by a groove and feather, the carriage T traversed by the screw rod $s^3$, the guide roll $T^2$ upon the carriage, the plate $s^4$ in which the sleeve $s^2$ is free to rotate but not to move longitudinally, the plate $s^6$ connected to the plate $s^4$, the double incline $s^7$ upon the plate $s^6$, the spring catch $s^8$ fixed to the frame of the flier, and the springs $s^9$ upon the screw rod $s^3$ forming abutments for the carriage T.

12. In a wire barbing machine, the combination of mechanism for simultaneously twisting two or more barbing wires or sets of barbing wires around both of two main wires so forming two or more barbs upon the main wires, mechanism for twisting the main wires together, and mechanism for preventing the main wires from being twisted in the barbing mechanism.

JOHN STEWART REID.

Witnesses:
 WALTER J. SKERTEN,
 THOMAS LAKE,
*Both of No. 17 Gracechurch Street, London.*